Feb. 6, 1940. P. HEINISCH 2,189,500
MOTION PICTURE CAMERA
Filed Dec. 16, 1937
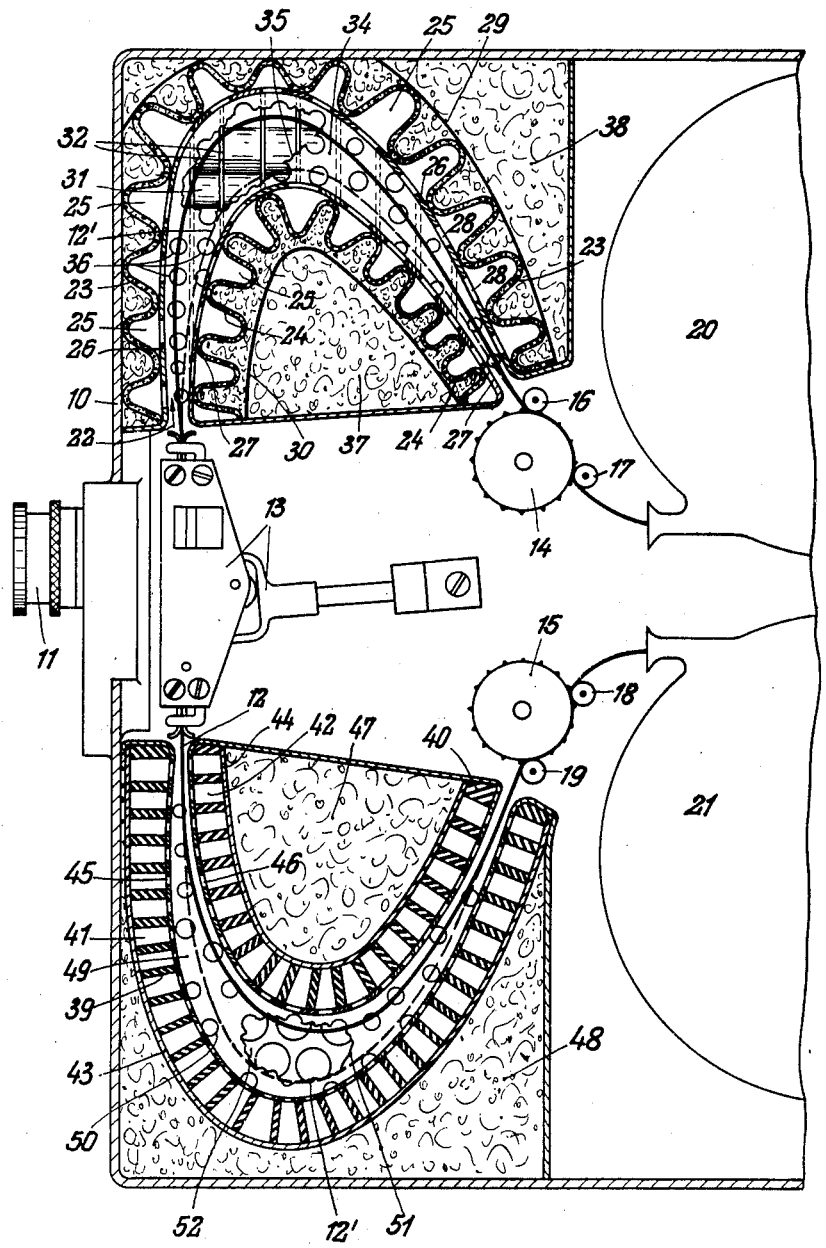
Inventor:
Paul Heinisch Patented Feb. 6, 1940

2,189,500

UNITED STATES PATENT OFFICE 2,189,500

MOTION PICTURE CAMERA

Paul Heinisch, Berlin-Zehlendorf, Germany, assignor to Askania-Werke A. G., a corporation of Germany Application December 16, 1937, Serial No. 180,238
In Germany December 17, 1936

2 Claims. (Cl. 88—17)

This invention relates to motion picture apparatus, more particularly to motion picture cameras for taking sound pictures.

This invention aims at providing a silent camera for taking pictures in close proximity of a sound recording microphone.

It is accordingly an object of this invention to provide in a camera means for silencing the noise produced by the camera mechanism, more particularly, the noise caused by the film feeding mechanism and the shutter.

It is a further object of this invention to provide means for absorbing the noise caused by the flapping of the film intermittently moved past the exposure aperture.

As far as I am aware it has been the practice heretofore to silence a camera by acoustically insulating the camera mechanism. This was accomplished by enclosing the entire camera into additional casings or by mounting single noise producing elements in sound insulating mountings in the camera, such as rubber, felt, and the like.

According to my invention I provide in a camera means having sound absorbing rather than sound insulating qualities. The sound silencing means accordingly absorb or deaden noise by transforming sound energy into heat.

This invention is based on the phenomenon that a volume of air enclosed within an acoustic cell will vibrate in response to sounds of certain frequencies, thereby consuming sound energy which is transformed into heat. Such cells are known in the art as Helmholtz resonators named after a famous physicist who discovered the sound absorbing effect.

While the noise caused by the camera mechanism may be successfully reduced by redesigning the mechanism no way has been known heretofore, as far as I am aware, to eliminate the noise caused by an intermittently moved flapping strip of film.

According to this invention it is possible to reduce the noise of the film in a considerable degree, thereby adapting a camera having a smooth running mechanism for the recording of sound pictures without the necessity of a sound insulating casing.

Further aims, objects, and advantages of this invention will appear from a consideration of the description which follows with the accompanying drawing showing for purely illustrative purposes an embodiment of this invention. It is to be understood, however, that the description is not to be taken in a limiting sense, the scope of this invention being defined in the appended claims.

The figure is a sectional elevation of a camera embodying two different forms of sound silencing cells.

A camera casing 10 is provided with an exposure aperture 11 past which a strip of film 12 is intermittently moved by a feeding mechanism 13. Sprocket spools 14 and 15 and rollers 16, 17 and 18, 19 are provided for guiding the film into 10 and out of magazines 20, 21.

While the sprocket spools 14 and 15 are continuously rotated by means not further shown in the drawing, the film is moved past the exposure aperture in an intermittent movement, thereby causing the loops formed by the film between the feeding mechanism and the sprocket spools 14 and 15, respectively, constantly to vary their length. To illustrate this movement the loops of the film after a feeding movement in the direction of the arrow 22 are shown as a solid line 12—12 while the loops immediately before the feeding movement assume the form of the dotted lines 12'.

It is easily understood that the constant flapping of the film causes noise which can not be avoided in mechanism having an intermittently operating feeding mechanism.

Sound absorbing cells are provided each cell inclosing a certain volume of air for absorbing sound energy of the film and silencing the camera.

In the upper half of the drawing sound absorbing cells are shown arranged adjacent to the path of the film and formed by strips of corrugated material 23 and 24 forming cells 25 with walls 26 and 27 having perforations 28. The corrugated material 23 and 24 is so arranged that the corrugations abut the walls 26 and 27 between perforations of the latter.

The spaces formed by the corrugated material are subdivided by further walls or ribs shown at 29 and 30 and lying parallel with the plane of the drawing to intersect the corrugated material 23 and 24. At the portion visible immediately behind the loop of the film the corrugated material is shown at 31 intersected by parallel ribs 32 forming cells therewith of an approximately square plane in the illustrated embodiment. In the section behind the film the perforated wall 34 is partly broken away at 35 showing the cells. The perforations are visible at 36.

Volumes of air are accordingly enclosed within the cells communicating with the interior of the camera casing through the perforations of the walls.

The cells have certain acoustic properties depending upon their size and volume. Sounds of a predetermined frequency will cause the air in the cells to vibrate, thereby absorbing sound energy which is transformed into heat.

In order to avoid a resounding of the walls of the cells the cells are preferably enclosed entirely or partially by sound absorbing material. For this reason the corrugated material may be made of rubber, felt, or the like. The walls 26 and 27 and 34 may be made of plywood, heavy cardboard, fiber, or the like. A further dampening effect may be attained by filling the space between the corrugations, and between the corrugations of the camera casing, respectively, with sound absorbing material, such as cotton or mineral wool shown at 37 and 38.

For illustrating purposes in the lower half of the drawing cells of a different construction are shown. In the lower half of the picture the cells are formed by thick plates or strips of rubber 39 and 40 having perforations 41 and 42. The plates are so formed as to provide a path for the loop of the film. The cells are closed at the outside by non-perforated walls 43 and 44. Perforated walls 45 and 46 at the inside permit the air in the cells to communicate with the inner space of the camera casing and to vibrate according to noises to be dampened. The inner space may again be filled with cotton or non-inflammable mineral wool or the like, indicated at 47 and 48.

Behind the path of the film a wall 49 is visible having perforations 50. In the illustration the wall is partially broken away at 51 to show the perforated material 52.

Obviously the present invention is not restricted to the particular embodiment herein shown and described.

What is claimed is:

1. In a motion picture camera the combination with a camera casing and film guiding means therein; of a perforated wall arranged adjacent to the path of the film between the film feeding mechanism and the film guiding means of said camera; a corrugated pliable sound absorbing material extending at the far side of the wall with respect to the path of the film, the successive corrugations abutting said wall between perforations of the latter; and partitions extending through said corrugations substantially at right angles thereto to form individual chambers therewith, the partitions abutting said wall between perforations of the latter, whereby separate cells are formed in the manner of Helmholtz-resonators, each cell enclosing a volume of air communicating with the interior of the camera casing through the said perforations, thereby causing the volume of air in the cells to vibrate in response to noise of the film consuming sound energy and silencing the camera.

2. In a motion picture camera the combination with a camera casing and film guiding means therein; of a perforated first wall arranged adjacent to the path of the film between the film feeding mechanism and the film guiding means of said camera; a layer of sound absorbing material arranged adjacent to and in contact with said wall and on the far side thereof with respect to the path of the film, said material having perforations of larger cross sectional area than said wall; a second wall adjacent to and in contact with said sound absorbing material, whereby separate cells in the manner of Helmholtz resonators are formed of said walls and material, each cell enclosing a volume of air and communicating with the interior of the camera casing through the perforations of the said first wall, whereby the volumes of air will be caused to vibrate in response to noise of the film consuming sound energy and silencing the camera.

PAUL HEINISCH.